United States Patent [19]

Matos et al.

[11] 4,257,988
[45] Mar. 24, 1981

[54] METHOD AND ASSEMBLY FOR MOLDING OPTICAL LENSES

[75] Inventors: R. Jay Matos, Vestavia; Eliseo J. Matos; Robert Blaik, both of Birmingham, all of Ala.

[73] Assignee: Optical Warehouse Showroom and Manufacturing, Inc., Birmingham, Ala.

[21] Appl. No.: 941,797

[22] Filed: Sep. 12, 1978
(Under 37 CFR 1.47)

[51] Int. Cl.³ ............................................. B29D 11/00
[52] U.S. Cl. ...................................... 264/1.1; 249/82; 249/139; 249/160; 425/808
[58] Field of Search .............. 264/1; 425/808; 249/82, 249/139, 160

[56] References Cited

U.S. PATENT DOCUMENTS

| | | | |
|---|---|---|---|
| 2,266,169 | 12/1941 | Crumrine | 264/1 |
| 2,333,051 | 10/1943 | Smith | 425/808 |
| 2,890,486 | 6/1959 | Crandon | 425/808 |
| 3,038,210 | 6/1962 | Hungerford | 264/1 |
| 3,222,432 | 12/1965 | Grandperret | 425/808 |
| 3,364,525 | 1/1968 | Davy et al. | 425/808 |
| 3,404,861 | 10/1968 | Ewer | 425/808 |
| 3,528,135 | 9/1970 | Reiterman | 425/808 |
| 3,871,803 | 3/1975 | Beattie | 425/808 |
| 4,095,772 | 6/1978 | Weber | 425/808 |

FOREIGN PATENT DOCUMENTS

| | | | |
|---|---|---|---|
| 847797 | 9/1960 | United Kingdom | 264/1 |
| 909574 | 10/1962 | United Kingdom | 264/1 |

Primary Examiner—James B. Lowe
Attorney, Agent, or Firm—Larson, Taylor and Hinds

[57] ABSTRACT

A method and assembly for molding plastic optical lenses. The mold assembly comprises an annular retainer ring supporting a pair of generally disc shaped mold parts urged toward each other by a resilient force while separated by one or more gaskets, preferably including at least one soft gasket of uniform thickness between its inside and outside diameters which has the property of softening at elevated temperatures. When the cavity formed between the mold parts and bounded peripherally by the gaskets is filled with a resin formulation in the form of a liquid which then polymerizes when raised to an elevated curing temperature, shrinking and becoming hard and insoluble at room temperature, in the process the softening of the gasket permits the mold parts, under the action of the resilient force, to move towards each other to maintain contact with the formulation as it shrinks and hardens. A nest in which the assembly in the retainer ring is mounted has attached thereto a spring biased clamp arm for exerting the resilient force to urge the mold parts towards each other, the direction and location of such force being precisely determinable relative to the mounted retainer ring.

22 Claims, 8 Drawing Figures

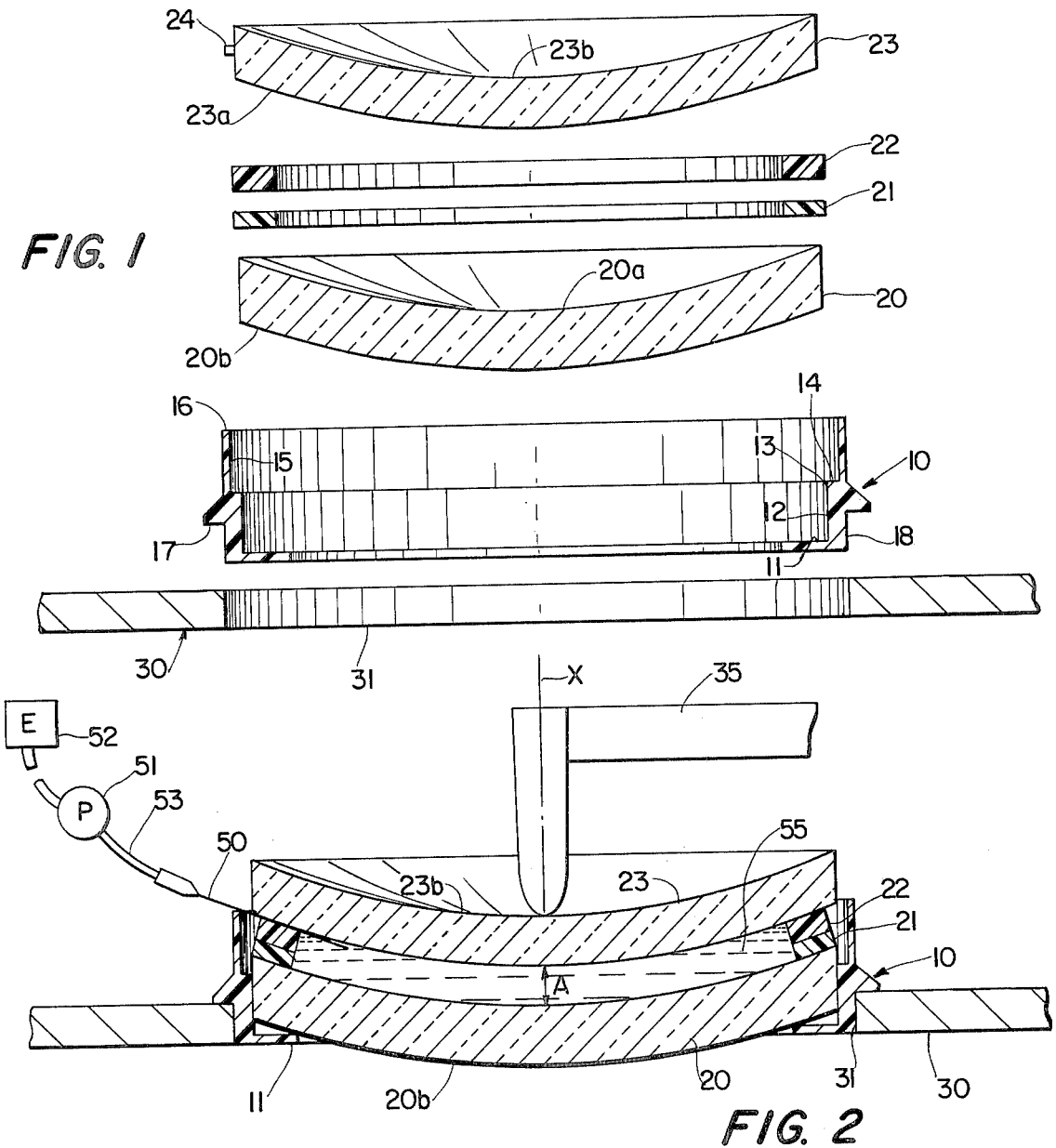
FIG. 1
FIG. 2
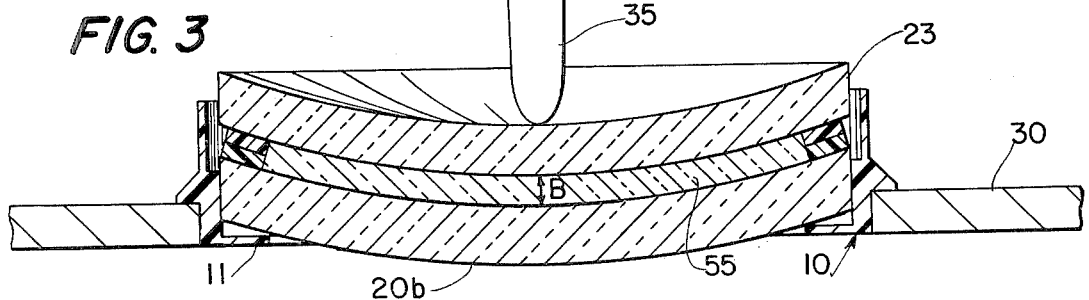
FIG. 3

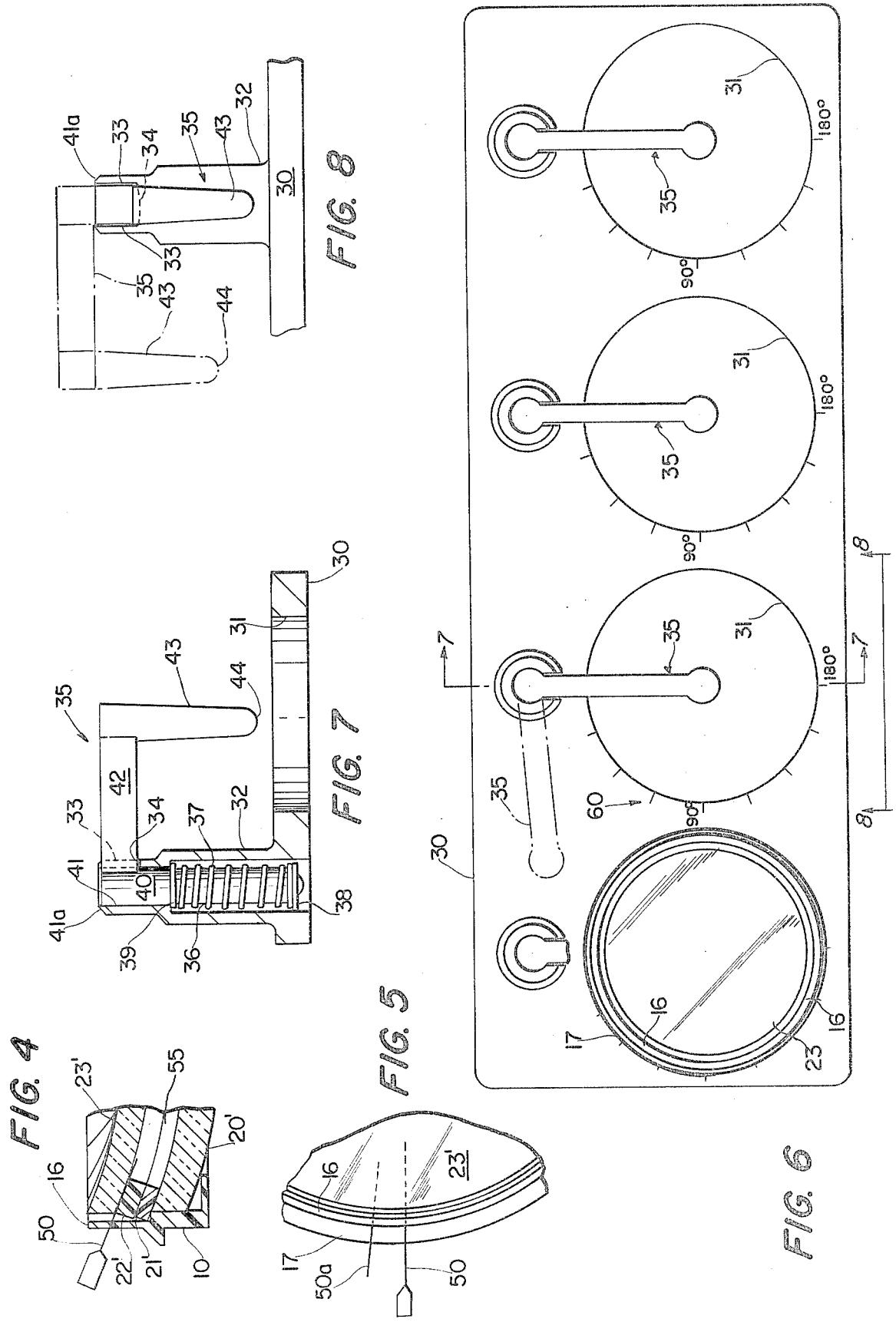

METHOD AND ASSEMBLY FOR MOLDING OPTICAL LENSES

BACKGROUND OF THE INVENTION

This invention relates to optical lenses, and in particular it relates to an improved method and mold assembly for making plastic lenses.

The principal use for lenses of the present type is as opthalmic lenses for use in eyeglasses, and for this reason the present invention will be described especially with respect to such lenses. However, it should be understood that lenses made in accordance with the present invention also have utility in other fields requiring high quality optical surfaces such as photography, instrument lenses, optical filters and the like.

It has been known to form optical lenses or the like out of a plastic material, and in particular out of a cross-linkable resin monomer that is polymerized and solidified by heat curing while in a mold. Exemplary of such prior processes and mold assemblies are those shown in the U.S. Pats. to Beattie, No. 2,542,386, Weinberg, No. 3,056,166, Slyk, No. 3,136,000, Grandperret, No. 3,222,432, Campbell, No. 3,605,195, Goodwin et al No. 3,821,333, and Beattie, No. 3,931,373. Some of these patents, as well as an earlier U.S. Pat. to Tillyer, No. 2,304,217, have also suggested the desirability of casting a finished lens ready for use (except for being cut around its periphery to fit a particular spectacle frame) rather than casting a semi-finished lens still requiring additional surface treatment such as blocking, generating, grinding, or polishing.

However, these previous mold assemblies and processes have suffered from certain major disadvantages which are overcome by the method and mold assembly of the present invention.

The resin materials used in accordance with these techniques tend to shrink when heated during curing. Depending on the specific material used, such shrinkage can range between approximately 12 to 17 percent. Consequently, in the absence of any corrective action, the liquid will separate from one or both mold surfaces and the finished lens will harden spaced from one or both of the mold surfaces and hence it will not conform to the shape of such mold surfaces. Such imperfections may be acceptable when, as is the case in many of the above cited prior patents, the sole purpose is to form semi-finished lenses to be kept in stock by a lab and subsequently further surface treated to fit a specific prescription. However, lenses cast in this manner would obviously be totally useless if the purpose is to form a finished lens directly from the mold requiring no further surface treatment.

Attempts have been made heretofore to take some corrective action to compensate for shrinkage of the liquid as it is polymerized and solidified. Firstly, it is common practice, as described in many of the above noted U.S. Patents, to provide a gasket around the periphery of the space between the two mold parts of a resilient material which can yield under the spring force urging the mold parts together. An improvement of this technique is described in the U.S. Pat. to Grandperret, No. 3,222,432 and Goodwin et al, No. 3,821,333. As described therein, the gasket is formed of a material having the property of softening at elevated temperatures so as to facilitate movement of the mold parts towards each other at the elevated curing temperatures. However, even this improvement has not satisfactorily solved the problem. The gaskets shown in the Grandperret and Goodwin et al patents are essentially of the "T" shaped variety wherein a ring having a "T" shaped cross-section concurrently holds the two mold parts and forms a seal around the periphery of the cavity between the mold parts. We have found that a disadvantage of this arrangement is that the softening feature takes place throughout the cross-section of the "T" and as this entire cross-section becomes soft and compressed under the spring force holding the mold parts together, it is not practical or possible for that portion of the "T" forming the seal between the mold parts to move with perfect parallelism throughout its entire circumference. Accordingly, while the mold parts might well move together and remain in contact with the liquid, they would tend to move in a non-parallel manner with a resultant disadvantage that the finished lens has unwanted prism characteristics, i.e. it is not of the desired thickness at all points, i.e. it is thinner than desired at some points and thicker than desired at other points. Once again, if the purpose of the molding procedure is to form a finished lens, ready for use without further surface treatments, a lens having undesirable prism properties is totally useless and must be discarded.

The problem of providing a perfect finished lens by having the mold parts move toward each other in a perfectly uniform manner and maintain contact with the liquid throughout the process is complex and difficult enough when forming a perfectly spherical lens. However, the complexity of this problem is compounded when the operator attempts to make a complex lens, i.e. one having further corrections including a cylindrical correction, i.e. the providing of an axis in the finished lens perpendicular to the central axis of the mold assembly and/or providing a multifocal segment. Indeed, we believe that with currently known techniques it is not possible to reliably and consistently form finished plastic lenses having both cylindrical correction and a multifocal segment. In prior techniques the problem has been avoided to some extent by attempting to provide the multifocal segment and/or the cylindrical correction on the concave mold surface (the convex side of the lens) which apparently is less likely to separate from the shrinking and hardening formulation then is the convex mold surface. Such an arrangement is shown for example in the Calkins et al U.S. Pat. No. 3,946,982. However, even this has not been entirely satisfactory, and there has been little or no success in providing such corrections on the concave side of the finished lens.

Hence, there exists a need for improvements in the field of plastic optical lenses which will permit the manufacture of more perfect optical lenses in a manner which will overcome the above described difficulties and disadvantages in the present state of the art.

SUMMARY OF THE INVENTION

It is a purpose of the present invention to provide a new and improved method and assembly for making plastic optical lenses wherein the difficulties and disadvantages of known techniques are overcome.

In accordance with a preferred method and assembly of the present invention a pair of generally disc shaped mold parts are brought together, separated by a gasket, thereby forming a cavity which is filled with a suitable liquid such as a monomer resin capable of being polymerized and solidified by heat curing, and by assuring that during the curing procedure the mold parts move towards each other to compensate for shrinkage of the injected liquid and to assure that such movement is completely parallel, i.e. not assymetrical relative to the central axis of the mold assembly.

A first features of the present invention which permits the achievement of this goal is the feature and procedure whereby the gasket or gaskets separating the mold parts from each other has the property of softening under load at the elevated curing temperatures and the gasket is so constructed that when it softens, it will soften uniformly, thereby permitting completely linear parallel movement of the mold parts towards each other. In accordance with a preferred embodiment of the invention, this is achieved by providing the gasket with at least a portion thereof having the said softening characteristic and being of a uniform thickness from its inside diameter to its outside diameter.

Another feature of the present invention which either separately or in cooperation with the above described feature permits achievement of the purpose of the invention is to provide a new and improved arrangement for mounting the mold assembly so that the resilient spring force urging the mold parts together is applied precisely at (or at least its resultant force is precisely at) the central axis of the mold assembly.

In accordance with preferred embodiments of the present invention, the mold assembly comprises an annular retainer ring having a lower shelf on which the lower mold part is mounted. The gaskets are then mounted on the upper, "inner" surface of this lower mold part. Depending on the desired thickness of the finished lens, there may be provided a single gasket having the said softening characteristic or a plurality of gaskets, one or some being simply spacer member(s) providing a greater spacing between the two mold parts and not having the property of softening at an elevated curing temperature while other gasket (s) of the plurality do have this feature. An upper mold part is then applied over the gaskets such that the lower "inner" surface thereof, together with the upper "inner" surface of the lower mold part and the inside diameter of the gasket or gaskets forms a cavity. A suitable liquid formulation such as a cross-linkable resin monomer capable of being polymerized and solidified by heat is then introduced by suitable means such as a syringe needle into the cavity. This liquid formulation may be fed from the source to the needle either by means of gravity or by means of a suitable pump such as a peristaltic pump.

After the mold parts and gaskets have been assembled on the retainer ring (and prior to insertion of the liquid) this assembly may be positively positioned on a nest, for example by locating the retainer ring into an opening formed in the nest. In accordance with a feature of the present invention, a spring means positively positioned with respect to the nest, and hence now also positively positioned with respect to the retainer ring and the parts mounted therein, is brought against the mold assembly such that the resilient force is applied precisely along the central axis of the retainer rings. This spring means may comprise a clamp arm movable laterally, when separated from the mold parts so as to provide free access for mounting the mold assembly in the nest opening.

The above described features, including the provision of a gasket which can soften and hence be uniformly and linearly compressed under load at elevated temperatures, and the provision of a precisely located and directed spring force, especially when applied together, assure that the mold parts will move towards each other uniformly, i.e. linearly with parallelism, to assure that the mold parts maintain contact with the liquid as it shrinks and hardens and to assure that the finished lens has a shape imparted to it from the mold parts which is precisely the shape which the operator originally desired to have imparted to the finished lens.

The provision of a new and improved mold assembly and method according to the present invention which reliably permits the formation of a correct finished lens, even of a complex lens having multiple corrections including cylinder, or multifocal segments, can revolutionize laboratory techniques for making finished plastic lenses. With such a reliable method and mold assembly, the lab can keep on hand a certain number of different sized upper and lower mold parts (these will normally be made out of glass or another hard material and hence capable of reuse) and a selection of gaskets of different sizes (and replacement gaskets since these will probably be used only once) and with the aid of a computer memory the lab can simply select the appropriate one of the upper and lower mold parts and the appropriate gasket or gaskets, assemble them in accordance with the present invention, and provide a finished lens of the desired prescription.

Hence, it is an object of the present invention to provide a new and improved mold assembly for forming plastic optical lenses.

It is another object of the present invention to provide a new and improved method for forming plastic optical lenses.

It is still another object of this invention to provide a new and improved mold assembly and method for forming an optical lens wherein mold parts which form a cavity into which is injected a liquid capable of being polymerized and solidified at elevated temperatures moves towards each other uniformly, in parallelism, and sufficiently to maintain contact with the liquid as it shrinks and solidifies.

It is still another object of this invention to provide gasket elements for separating mold parts of the type used for forming an optical lens, wherein the gaskets are formed of a material which softens at elevated temperatures, thereby permitting uniform movement of the mold parts towards each other.

It is still another object of the present invention to provide a mold assembly and method comprising a pair of mold parts forming therebetween a cavity fillable with a liquid capable of being polymerized and solidified and including resilient means for urging the mold parts together, wherein the direction and location of the resilient force urging the mold parts together is located very precisely with respect to the mold assembly.

It is still another object of this invention to provide an assembly and method wherein a mold assembly for forming a plastic optical lens can be positively mounted on a supporting nest structure and wherein a clamping arm positioned with respect to said nest structure can be brought into a position to apply a resilient force with its resultant precisely along the central axis of the mold assembly.

These and other objects of the present invention will become apparent from the detailed description to follow of preferred embodiments of the present invention which are to be read together with the accompanying drawings.

BRIEF DESCRIPTION OF THE DRAWINGS

There follows a detailed description of preferred emboiments of the invention to be read together with the accompanying drawings in which:

FIG. 1 is an exploded central sectional view of a mold assembly in accordance with the present invention.

FIG. 2 is a central sectional view of the mold assembly of FIG. 1 with the parts assembled and shown at an early stage in the process of forming of an optical lens in accordance with the present invention.

FIG. 3 is a central sectional view similar to FIG. 2 but showing the same parts at a later stage in the process of forming an optical lens.

FIG. 4 is a partial, central sectional view similar to FIG. 2 but showing a variation in the operation of the present invention.

FIG. 5 is a partial plan view of FIG. 4.

FIG. 6 is a plan view of a nest structure for mounting a plurality of mold assemblies of the type shown in FIGS. 1–5, and showing one of such mold assemblies in plan view mounted in the left hand nest opening of the nest structure.

FIG. 7 is a cross-sectional view taken along line 7—7 of FIG. 6.

FIG. 8 is a partial side elevational view taken in the plane of line 8—8 of FIG. 6.

DETAILED DESCRIPTION OF THE PREFERRED EMBODIMENTS

Referring now to the drawings, like elements are represented by like numerals throughout the several views.

Referring to FIG. 1 there is shown a retainer ring 10 having a shelf 11, a lower vertical side wall 12, a corner 13 between side wall 12 and a ledge 14, an upper vertical side wall 15 having a greater inside diameter than the inside side wall 12, and a top rim 16. On its exterior, the retainer ring 10 includes a flange 17 encircling the same and the outside diameter of lower outside side wall 18 beneath the flange 17 is of a size to just fit within the opening 31 of a nest 39 which will be described in greater detail below. The retainer ring must be of a material which is immune to the heat of the curing step and inert so that it will not bleed into the liquid formulation. Polypropylene has been found suitable for this purpose.

There is also shown in FIG. 1 a lower mold part 29 having an upper "inner" surface 20a and a lower, outer surface 20b. (Referring briefly to FIGS. 2 and 3, in use the lower surface 20b rests on shelf 11.) Above the lower mold part 20 in FIG. 1 there is shown a pair of gaskets 21 and 22. Gasket 21 is a "hard" gasket which, while somewhat somewhat resilient, deforms only elastically, i.e. not inelastically at the elevated temperatures to which it is contemplated that the mold assembly of the present invention will be subjected. These hard gaskets may be formed for example of a clear acrylic. The gasket 22 is formed of a "soft" material having the property of softening, i.e. "creeping" at the elevated temperatures which will be utilized in carrying out the curing step. This is to allow the upper mold part 23 to move, under the action of a resilient force, toward the mold part 20 during the heating step in a manner and for a purpose to be described in greater detail below. Materials having this softening capability are known and have been described in certain of the patents referred to above, e.g. U.S. Pat. Nos. 3,222,432 and 3,821,333. We have found it to be particularly suitable clear polyvinyl chloride such as those sold under the trademarks TYGON and DUPONT'S ADA - 3101, and preferably having a hardness of approximately 60 durometers and excluding plasticizers which could bleed into the liquid formulation.

Above the gasket 22 in FIG. 1 there is shown an upper mold part 23 having a lower, inner convex surface 23a and an upper, concave outer surface 23b. Also shown in FIG. 1 on mold part 23 is a notch 24 which, as will be explained below, is utilized to rotationally position the upper mold part 23, if necessary, relative to the lower mold part 20.

FIGS. 2 through 5 illustrate the parts of FIG. 1 in an assembled condition and will be referred to to describe the operation of the elements of FIG. 1 in carrying out the method of the present invention. However, it is first advantageous to refer to FIGS. 6 through 8 for an understanding of the nest and clamp arm structure of the present invention.

FIG. 6 shows a nest structure 30 having a plurality, in this case four, nest openings 31. In carrying out the method of the present invention, the mold assemblies are placed into an oven for curing at an elevated temperature for a predetermined period of time, and it is therefore advantageous to provide such a nest structure adapted to receive a plurality of such mold assemblies so that they can all be placed into the curing oven together. Each nest opening 31 has associated with it a clamp arm 35. Since each nest opening and its associated clamp arm are identical to the others, only one of them will be described in detail below. While the second from the left nest opening 31 of FIG. 6 will be described in detail, reference is made to the far left nest opening of FIG. 1 from which the clamp arm has been deleted and in which the mold assembly of FIGS. 2 and 3 is shown in plan view.

Referring now to FIGS. 6 through 8, and in particular FIGS. 7 and 8, there is provided on the nest structure 30 associated with each nest opening 31 a raised hollow post 32 having at its upper end a pair of parallel walls 33 defining the sides of an open top slot which is bounded by a bottom edge 34. The clamp arm 35 includes a rod part 36 located within the raised hollow post 32 and including a spring 37 mounted thereon. At its lower end, this spring abuts a washer 38 mounted on the rod part 36. At its upper end the spring abuts shoulder 39 where the inside diameter of raised part 32 narrows to form a sleeve part 41 receiving the upper part 40 of the rod part 36. The uppermost rim of the sleeve part 41 is designated as 41a. Extending outwardly from cylindrical part 40 and rigid therewith is a cross-arm 42 and extending downwardly from the outer end thereof is a pressure part 43 having a pressure surface 44 at the lower end thereof which actually engages the upper outer surface 23b of the upper mold part 23.

Angular indicia 60 are preferably marked along the edge of nest opening 31 firstly to provide a zero reference for angularly positioning the retainer ring 10 and the mold part 20 and secondly for turning the mold part 23 relative to the mold part 20 in such cases as that may be required.

Referring now to all of the drawings, but especially to FIGS. 2 and 3, the mold assembly of the present invention is operated as follows in carrying out the method of the present invention.

Firstly, it should be understood that a significant advantage of the present invention is that it makes possible the formation of a high quality finished lens requiring no further surface processing such as blocking, generating, grinding or polishing. Rather, it requires only cutting out from the molded lens that portion shaped to fit the particular frame for which it is intended. Consequently, all elements must be of the precise shape and size so as to provide such a finished lens. In accordance therewith, a laboratory utilizing the present system will necessarily have on hand a large number, perhaps hundreds of lower mold parts 20, upper mold parts 23 and gaskets 21 and 22. In a manner which does not form a part of the present invention, the laboratory will be able to read the prescription and select by suitable means such as a computer the correct elements 20 through 23 to provide the desired finished lens. In accordance therewith the operator will first select a proper lower mold part 20 and secure the same in place on the shelf 11 of the retainer ring 10. For convenience, the lower mold parts 20 may be previously stored each in its own retainer ring 10. The retainer ring is preferably sufficiently resilient so that it can snap or friction fit firmly in place in its nest opening 31.

The operator will then select the proper gaskets 21 and/or 22. Both types of gaskets are to some extent resilient at room temperature, i.e. elastically deformable, so as to provide a good seal, while at elevated temperatures the gasket 21 will essentially retain its shape while the gasket 22 will soften, thereby to some extent non-elastically deforming, permitting movement of the upper mold part 23 towards the lower mold part 20.

The operator will then select the proper upper mold part 23 and place it over the gaskets, forming a cavity 55.

Next, the retainer ring 10 with the mold parts thus assembled is placed into a nest opening 31 on the nest 30 and the clamp arm 35 associated therewith is lowered to urge the mold parts together. At this time a large gauge syringe needle is inserted between elements 22 and 23, as shown in FIG. 2 and the plastic liquid formulation is delivered from source 52, preferably through a pump 51 and a line 53 through the syringe needle 50 until the liquid completely fills the cavity 55, free of all air bubbles. The small space surrounding the needle 50 between elements 22 and 23 is sufficient for removal of air within the cavity. At this stage the mold assembly is essentially in the condition as shown in FIG. 2. Note the thickness of the soft gasket 22 and the height A of the liquid filled cavity.

Many liquids have been known heretofore, such as those described in the above noted U.S. Pat. Nos. 3,222,432 and 3,821,333 for forming plastic lenses. While any of these liquids would be suitable for forming lenses in the mold assembly and method of the present invention, we have found it suitable to use a polycarbonate thermosetting resin which polymerizes into a water clear infusible and insoluble solid. Whatever liquid formulation is used, however, it is necessary to select gaskets 22 of a material and size such that its reduction in cross-section under the combined effects of heat and the spring force of clamp 35 will be such that movement of the upper mold part 23 toward the lower mold part 20 is proportional to the shrinkage of the thickness of the liquid in cavity 55 as it polymerizes and hardens.

The nest 30, preferably with all four nest openings 31 containing a different mold assembly, is then heated, preferably in a convection curing oven. After the proper time in the oven, the nest is removed. FIG. 3 illustrates the condition of the mold assembly after the heating step. Note that the height of the cavity 55 has now been reduced from an amount indicated by arrow A to the amount indicated by arrow B, this resulting from shrinkage of the formulation during the curing step. However, in accordance with the present invention the soft gasket 22 also became soft and permanently reduced in thickness, allowing the mold part 23, and in particular the surface 23a thereof to follow the formulation and maintain contact with the liquid as it hardened. Consequently, the surface of the lens against surface 23a will be of a high quality.

Further, in accordance with the present invention, since the gasket 22 is of uniform thickness from its inside diameter to its outside diameter, as contrasted to the "T" shaped gaskets shown in U.S. Pat. Nos. 3,222,432 and 3,821,333, it will deform linearly and uniformly, permitting the whole mold part 23 to move in a parallel fashion toward the mold part 20. In contrast thereto, if the softening gasket is not of a uniform thickness throughout, the entire "T" section will itself soften, thus preventing uniform parallel movement of the mold 23 toward the mold part 20.

The preceding discussion has presumed that it is desired to form a purely spherical lens. Even in that case, however, it would probably be necessary to orient even the retainer ring 10 and hence the lower mold part 20 angularly to align a reference mark on the retainer ring 10 and hence for the lower mold part 20 in the nest 31. If the prescription is only for a single vision lens the top mold surface would be spherical and no further ajustments would be required. However, if the prescription is for cylindrical correction, it may be necessary to rotate the upper mold part 23 relative to the lower mold part 20 and the retainer ring 10. This would be accomplished by aligning the notch 24 on the mold part 23 with the appropriate one of the indicia 60. Similarly, if the prescription is for a bifocal lense, the bifocal segment, while also spherical in form, further contains the bifocal segment and this segmented mold surface must be rotated to the proper position as indicated by the proper indicia 60.

It is a significant advantage of the present invention that it provides such complete cooperation between the surface 23a of mold part 23 and the surface of the finished lens which it engages that it permits considerable variations from spherical in that surface, i.e. the concave surface of the finished lens, thereby greatly facilitating forming lenses with different and complex prescriptions.

FIGS. 4 and 5 illustrate certain variations in the present invention.

Firstly, in FIG. 2 the needle 50 was shown passing over the rim 16 of the retainer ring 10. This was possible because the lower mold part 20 and the gaskets 21 and 22 came up to such a height that the needle could pass over the rim 16. However, it is possible that these parts, referring to elements 20', 21' and 22' in FIG. 4 might not reach rim 16. In this case it would be necessary to pass the needle 50 through the wall of retainer ring 10. In this case, as shown in FIG. 5, it would also be necessary to provide a second needle 50a for removal of air from the cavity 55.

Also shown in FIGS. 4 and 5 is another variation. In this case the lower mold part 20' just comes up to the level of the ledge 14. In this case the gaskets 21' and 22' can be of a slightly larger outside diameter and can rest at their outer peripheries on the ledge 14. This additional support for the hard gasket 21' will further facilitate the uniform distortion of the soft gasket 22'. Also, the provision of the enlarged inside diameter portion 15 of the retainer ring 10 could provide an area for moving the upper mold part 23' laterally, i.e. assymetrically with respect to the lower mold part 20', if a prescription called for this.

Although the invention has been described in considerable detail with respect to preferred embodiments thereof, it will be apparent that the invention is capable of numerous modifications and variations apparent to those skilled in the art, without departing from the spirit and scope of the invention.

We claim:

1. A method of molding anoptical lens comprising the steps of:
   arranging a first generally disc shaped mold part with an outer surface thereof supported by a shelf of a retainer ring,
   arranging on the inner surface of the first mold part opposite the said surface and near the periphery thereof a pair of adjacent gaskets, one of which is a hard spacer which maintains its shape at elevated temperatures under load, except for elastic deformation, and the other is a soft gasket having the property of softening so as to creep under load at elevated temperatures, and arranging the two gaskets adjacent to each other so that the inside diameter of each forms a part of the cavity,
   arranging a second generally disc shape mold part with an inner surface thereof against the gasket so as to define an enclosed cavity with the inside diameter of the gasket and the said inner surface of the first mold part,
   exerting a resilient force to urge the two mold parts toward each other, so as to hold the two mold parts and the gasket together as they form said cavity by a means which is positively located relative to the retainer means to exert the force precisely centered along the axis of the retainer ring,
   filling said cavity with a liquid capable of being converted into a state in which, upon being heated, it shrinks in volume and becomes hard and insoluble at room temperature,
   heating the mold assembly with the said liquid filling the said cavity,
   and wherein the magnitude of the resilient force and the creeping characteristic of the gasket are such that as the liquid shrinks during the heating step, the two mold parts move toward each other to maintain contact with the liquid throughout the said conversion and hardening of the liquid in the cavity.

2. The method of claim 1, wherein the said inner surfaces of the first and second mold parts are concave and convex, respectively.

3. The method of claim 1, wherein the gasket having the property of softening is polyvinyl chloride containing no plasticizers.

4. The method of claim 1, wherein the retainer ring includes a side wall having a ledge on the inside thereof above the shelf, and said step of arranging the gaskets includes arranging the hard gasket with its lower surface resting on the periphery of said inner surface of the first mold part and also resting on the said ledge, and arranging the soft gasket on the hard gasket.

5. The method of claim 1, wherein the retainer ring includes a ledge on the inside thereof above the shelf, the inside diameter of the retainer ring being greater above the shelf then below it, and the step of arranging the second mold part on the gasket including locating it asymmetrically on the ledge and hence off center with respect to the first mold part.

6. The method of claim 1, wherein the step of arranging the first mold part includes positively fixing the retainer ring, with the mold assembly, in a nest, and said step of exerting a resilient force includes applying said force with a clamp arm, the position of which clamp arm is positively determinable with respect to the nest, such that the direction and location of the force exerted by the clamp arm on the mold assembly is positively determined with respect to the retainer ring and hence also with respect to the mold assembly contained therein.

7. The method of claim 6, wherein the nest includes a raised hollow post and the clamp arm includes a vertical rod part in the raised hollow post with a spring urging it downwardly, and including a horizontal cross-arm connected to the rod part and having a pressure part extending downwardly therefrom to engage the mold assembly, and the step of arranging the retainer ring in the nest including lifting the rod part, cross-arm and pressure part and turning them about the axis of the rod part, placing the retainer ring in the nest, and turning the rod part and lowering it with the cross-arm and pressure part to exert the said force on the mold assembly.

8. The method of claim 6, wherein the nest includes a circular recess for receiving the retainer ring, with indicia surrounding the recess, and said step of positively positioning the retainer ring includes placing it into the recess and rotating it to a predetermined angular position therein.

9. The method of claim 8, wherein the step of positively positioning the retainer ring further includes rotating the second mold part angularly with respect to the first mold part.

10. The method of claim 6, wherein the nest includes a raised hollow post and the clamp arm includes a vertical rod part within the post and a horizontal cross-arm connected to the rod, and a pressure part projecting downwardly toward the retainer ring with the mold assembly therein, and said step of exerting the resilient force includes urging the pressure part downwardly along the central axis of the said retainer ring and against the second mold part.

11. The method of claim 10, wherein the step of exerting includes applying the downward force with a spring located on the said rod part of the clamp arm.

12. The method of claim 6, wherein the nest has recess and the retainer ring has a flange on its outer periphery and the step of positively positioning the retainer ring in the nest includes placing the retainer ring in the recess with the flange resting on the edge of the recess.

13. The method of claim 12, wherein the nest includes angular indicia around the recess, and the step of positively positioning the retainer ring in the recess further includes turning the retainer ring to a proper preselected position in the recess.

14. The method of claims 12, wherein the inner surfaces of the first and second mold parts are concave and convex, respectively, with the outer surface of the first mold part being convex and extending downwardly below the bottom of the retainer ring, said step of positively positioning the retainer ring in the recess thus including permitting the lowermost part of the first mold part to be located down into the recess.

15. A mold assembly for molding optical lenses comprising:

an annular retainer ring having a shelf, a first generally disc shaped mold part poistively positioned on the retainer and supported by such a shelf, a set of a pair of annular resilient gaskets positioned against the inner surface of the first mold part near the periphery thereof, said set being of assentially uniform thickness, one of said gaskets of the set being a hard spacer which maintains its shape at elevated temperatures under load except for elastic deformation, and the other being a soft gasket having the property of softening so as to creep under load at elevated temperatures, a second generally disc shaped mold part positioned with an inner surface against the gasket set so as to define an enclosed cavity with the inside diameter of the gasket set and the inner surface of the first mold part, and resilient means including a spring biased arm for urging the two mold parts toward each other so as to hold the mold parts and the gasket together as they form the said cavity, said resilient means including means for positively locating the spring biased arm, relative to the retainer ring, to apply the resilient force precisely centered on the axis of the retainer ring, whereby when a liquid located in the cavity shrinks and hardens at elevated temperatures, the magnitude of the resilient force and the creeping characteristic of the gasket permit the mold parts to move uniformly toward each other to maintain contact with the liquid as the liquid hardens in the cavity.

16. A mold assembly according to claim 15, wherein the gasket having the property of softening is polyvinyl chloride containing no plasticizers.

17. A mold assembly according to claim 15, wherein the retainer ring includes a side wall having a ledge on the inside thereof above the shelf, and the hard spacer rests against both the periphery of the first mold part and the said ledge, and the soft gasket lies on the hard gasket.

18. A mold assembly according to claim 15, said retainer ring having means including said shelf and a side wall for positively positioning the first mold part against movement with respect thereto.

19. A mold assembly according to claim 18, wherein the said inside surfaces of the first and second mold parts are concave and convex, respectively.

20. A mold assembly according to claim 15, wherein the first mold part is positively positioned in the retainer ring against either lateral or vertical movement, and including a nest having means for receiving and positively positioning the retainer ring, and said spring biased arm being a clamp arm spring biased downwardly toward the retainer ring and positively positioned with respect to the nest such that the direction and location of the force exerted by the clamp arm on the mold assembly is positively determined with respect to the retainer ring and hence also with respect to the mold assembly contained therein.

21. A mold assembly according to claim 20, wherein the means in the nest for positively positioning the retainer ring comprises a circular recess with angle indicia located on the edge of the recess, whereby the retainer ring can be rotated within the recess to a desired angular position.

22. A mold assembly according to claim 20, wherein the nest includes a raised hollow post, a rod part located within the hollow post and rotatable about a vertical axis, a cross-arm connected to the rod part and a pressure part extending from the cross-arm down to the mold assembly, said rod part being rotatable about a vertical axis to move the cross-arm and pressure part laterally to permit positioning of the retainer ring in the nest, and turnable back over the retainer ring and movable downwardly thereonto to exert said resilient force.

* * * * *